United States Patent Office 3,506,345
Patented Apr. 14, 1970

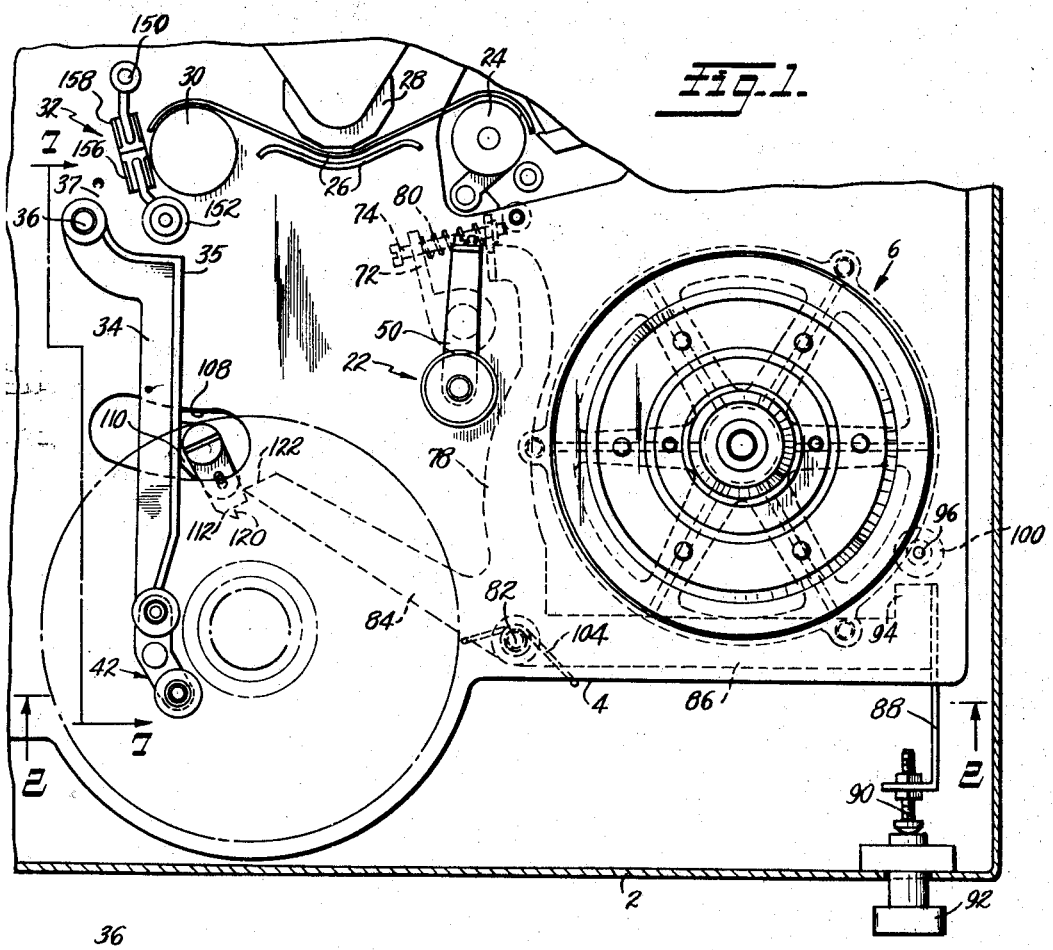

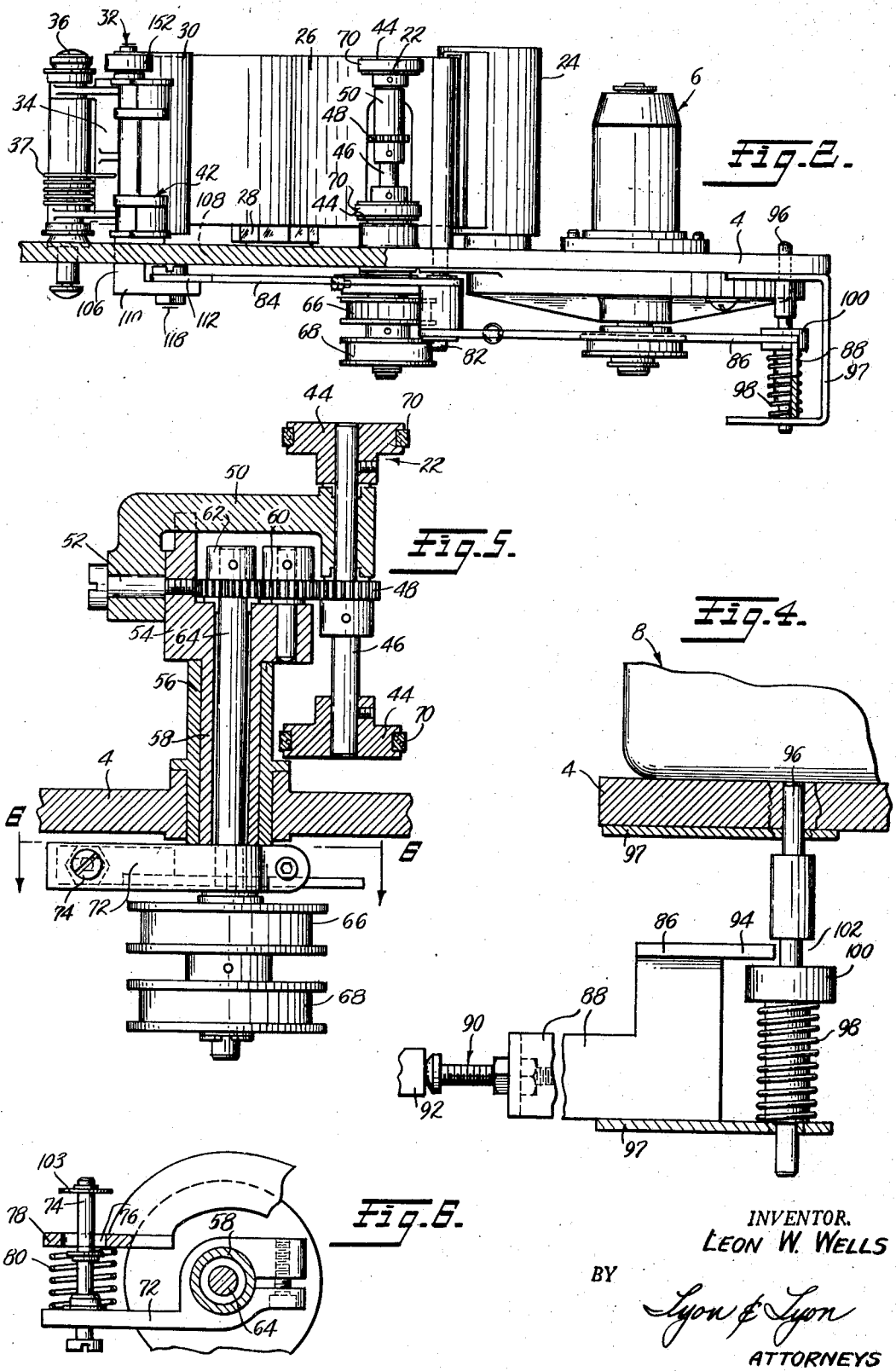

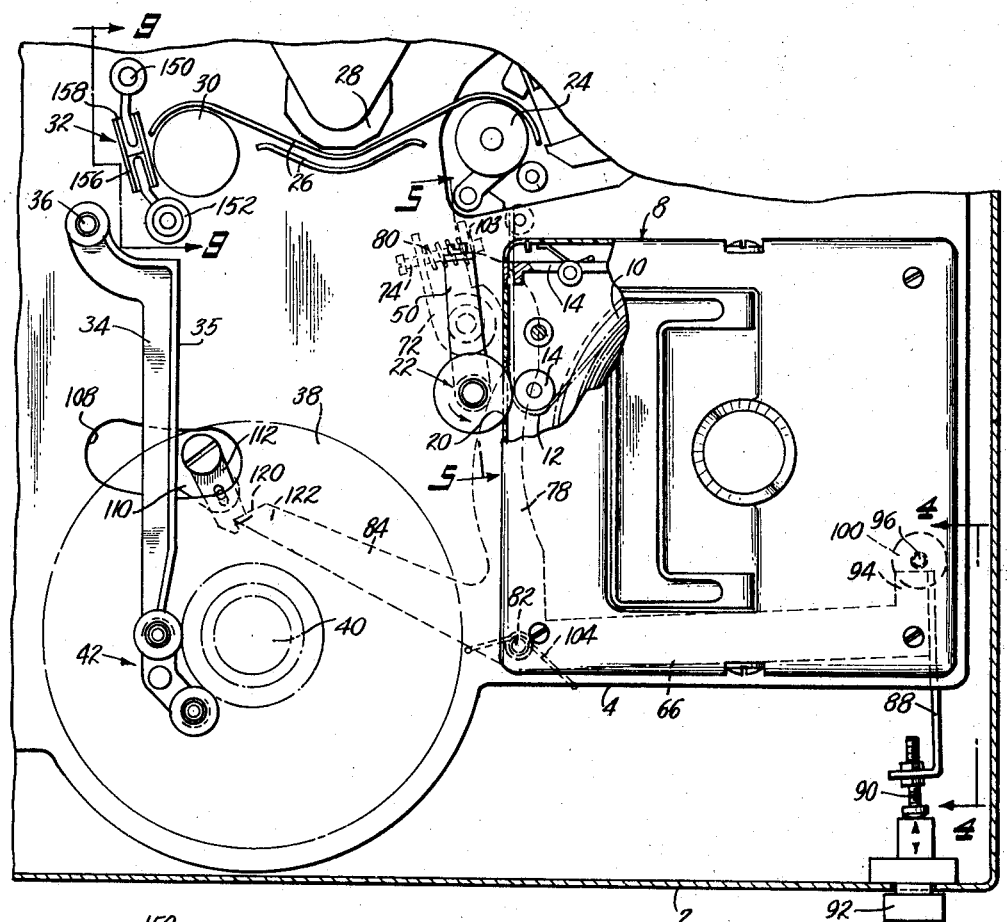

3,506,345
SELF-THREADING MOTION PICTURE
PROJECTOR
Leon W. Wells, Closter, N.J., assignor to Panopix Research Inc., New York, N.Y., a corporation of New York
Filed Apr. 14, 1967, Ser. No. 631,058
Int. Cl. G03b 23/02
U.S. Cl. 352—72      15 Claims

ABSTRACT OF THE DISCLOSURE

A projection machine having a driven friction drive roller movable into engagement with film in a cartridge to effect automatic threading of the film in the projector. A sensing mechanism detects the diameter of film on the take-up reel and when a predetermined diameter is reached the drive roller is retracted from the film cartridge, to run idly during the remainder of the projection cycle. The drive roller is initially engaged with the film by manual operation and is normally blocked against such actuation. The drive roller is released by placing a cartridge of film on the projector.

CROSS REFERENCE TO RELATED APPLICATIONS

The subject matter of this application constitutes improvements in the Improved Motion Picture Projector show and described in my prior application Ser. No. 541,196, filed Apr. 8, 1966, now Patent No. 3,458,251, and particularly to improvements adapting that projector for use with a film cartridge shown and described in my application Ser. No. 621,259, filed Mar. 7, 1967, now Patent No. 3,446,448 and entitled Improved Motion Picture Film Cartridge. The present disclosure also contains features shown in my prior application Ser. No. 626,290, filed Mar. 27, 1967, now Patent No. 3,446,448, and entitled Film Reed Drive Improvements, the present disclosure also involving features adapting the projection machine for use with the subject matter of the last-named prior application.

BACKGROUND OF THE INVENTION

In my prior application Ser. No. 541,196, I disclose a motion picture projector adapted to project successive parallel rows of picture frames from a single film, having a multiplicity of the rows thereon, each succeeding row being projected with the film travelling in a direction opposite to that of its direction of travel for projecting the previous row. The film moving and guiding mechanisms are mounted on a vertically movable platform that is automatically stepped upwardly at the completion of projection of each row of frames to align the next row with the optical projection system. As shown in that application, a cartridge containing the film to be projected is provided with a pivotally movable gate through which the film passes to the exterior of the cartridge. The platform of the projection machine is provided with a driven friction roller device rotatable about a fixed axis on the platform and adapted to extend through an opening in the pivoted gate to frictionally engage film therein. Rotation of the friction roller is in such direction that upon initially placing the cartridge in and starting the machine, the roller projects film from the cartridge into suitable guiding and transport means of the projector to a position where its leading end is directed to a take-up reel.

As shown in that prior application, the friction roller engages only the edge portions of the film and which edge portions are customarily provided with perforations bearing a definite positional relationship to the picture frames. After the film is threaded into the projector and onto the take-up reel, that friction roller remains in contact with the film during the entire projection cycle. Since the peripheral surfaces of the friction drive roller are preferably made of resilient material, such as rubber, their constant rolling engagement with the perforations along the edges of the film resulting in undue wear of the roller surface. Furthermore, the pivoted gate structure of the cartridge shown therein necessitated a cam arrangement on the machine to permit proper positioning of the cartridge in relation to the friction roller. The present invention relates to improvements in the self-threading and film guiding features of that machine.

SUMMARY OF THE INVENTION

The improved motion picture film cartridge described in my application Ser. No. 621,259 is not provided with a pivoted gate through which the film extends but is provided with guide means within the cartridge, including a roller positioned directly inwardly from an opening through a fixed side wall of the cartridge. The present invention relates to means for mounting the friction drive roller for lateral movement so that it can be withdrawn laterally from the cartridge after the film is threaded into the machine and it remains in this outer position during the entire projection cycle. Thus, the roller, while being driven at all times, merely rotates idly out of contact with the film after its threading function is completed. The machine is provided with a starting button but blocking means prevent actuation of that button in the absence of a cartridge of film in the projector. At this time, at the beginning of an operation, the drive roller is in retracted position and placement of a cartridge of film on the machine displaces the means blocking the starting button so that the latter can then be actuated to star projector operation. Actuation of the starting button also forcibly projects the friction drive roller into the opening in the cartridge wall where it frictionally engages the film to withdraw the same from the cartridge and project it toward the take-up reel. The friction drive roller being held in this driving position by a latch. When the leading end of the film reaches the take-up reel, it starts to wind thereon and after the roll of film on the take-up reel has built up to a predetermined diameter, sensing means effect release of the latch and a spring retracts the friction roller from the cartridge whereupon the machine continues to operate in the manner described in my application Ser. No. 541,196.

The invention also comprises a stabilizing roller means constantly engaging the film during a projection cycle to absorb any vibrations present at the take-up reel and preventing transmission thereof to a timing sprocket, which will be described in further detail.

BRIEF DESCRIPTION OF THE DRAWINGS

FIG. 1 is a fragmentary top plan view of a portion of a film projector embodying the present invention;

FIG. 2 is a fragmentary vertical sectional view taken on the line 2—2 of FIG. 1;

FIG. 3 is a fragmentary top plan view of a projection apparatus similar to FIG. 1 but with a film cartridge in place;

FIG. 4 is an enlarged fragmentary vertical sectional view taken on the line 4—4 of FIG. 3 showing the related parts in one relative position;

FIG. 5 is an enlarged fragmentary vertical sectional view taken on the line 5—5 of FIG. 3 showing the friction roller assembly;

FIG. 6 is a fragmentary horizontal sectional view taken on the line 6—6 of FIG. 5;

FIG. 7 is an enlarged fragmentary elevational view, with a portion thereof in section, taken on the line 7—7 of FIG. 1 showing the pressure or guide arm assembly;

FIG. 8 is an enlarged horizontal fragmentary sectional view taken on the line 8—8 of FIG. 7; and FIG. 9 is an enlarged vertical elevational view, with a portion thereof in section, taken on the line 9—9 of FIG. 3.

DESCRIPTION OF THE PREFERRED EMBODIMENT

In the drawings, numeral 2 designates the outer casing of a projection machine having therein a vertically movable platform 4 which may be moved and controlled in the manner described in my application Ser. No. 541,196. In FIG. 1, numeral 6 indicates generally a film cartridge receiving station having a drive means for drivingly engaging a film reel within a cartridge, all as described in my prior application entitled Film Reel Drive Improvements, Ser. No. 626,290. FIG. 3 is similar to FIG. 1 but illustrates a cartridge 8 in position on the machine in proper engagement with the reel drive means 6 shown in FIG. 1. The cartridge 8 includes a reel 10 therein having a film 12 wound thereon and directed over a guide and backing roller 14 then through a pivoted gate device 16 and outwardly of the cartridge through a slot 18 therein. The roller 14 is positioned directly inwardly to a pair of openings 20 in a side wall of the cartridge 8 in alignment with the perforated edge portion of the film and the film 12 is directed over that roller in a manner to pass between the roller and the adjacent side wall so that the edge portions of the film are exposed in the slots 20. A movably mounted friction drive roller 22, to be described in more detail later, can be moved to the position shown in FIG. 3 and being driven in a counterclockwise direction, it will frictionally project the leading edge of film 12 from the cartridge where suitable guide means direct it around a capstan drum 24, then between guide plates 26 through a projection zone and past a rotary prism 28, then around a timing sprocket 30, which is drivingly connected to the prism 28. The timing sprocket 30 is provided with conventional sprocket projections engaging at least one of the rows of perforations at the film edge to thereby ensure proper relationship between the rotary position of the prism 28 and successive picture frames on the film. The leading end of the film is then caused to pass from the timing sprocket 30 past a stabilizer device 32 and along a pressure or guide arm 34. The guide arm 34 defines a vertical guide surface 35 and is pivotally mounted on platform 4 at 36 and extends to the hub of a take-up reel 38. The take-up reel 38 is of the type shown and described in my application on Film Reel Drive Improvements, previously referred to. The guide arm 34 is spring-biased by spring 37 (FIG. 7) to urge its outer end toward the hub 40 of the take-up reel 38. A roller assembly 42 is pivotally mounted on the end of pressure and guide arm 34 and bears against the hub of the take-up reel and on any film wound thereon with some pressure. This ensures that the leading end of the film will be properly received and wrapped on the take-up reel, all as described in my application Ser. No. 541,196.

Referring now to FIG. 5, the friction drive roller 22 actually compirses two axially spaced apart roller elements 44 fixed to a shaft 46 having a gear 48 fixed thereon. The shaft 46 is journalled in an arm 50 which in turn is pivotally mounted, by screw 52, on a carrier device 54 for limited pivotal movement about a horizontal axis coincident with the center of the screw 52. The carrier device 54 is journalled in a journal sleeve 56 fixed to the platform 4, by an inner sleeve portion 58 extending downwardly below the platform 4 and below the lower end of journal sleeve 56. The gear 48 fixed to shaft 46 meshes loosely with an idler gear 60 journalled on the carrier 54 and the gear 60 is in turn loosely meshed with a gear 62 fixed to the upper end of a drive shaft 64 journalled in the carrier 54 and extend downwardly through the platform 4. The lower end of the shaft 64 has drive pulleys 66 and 68 fixed thereon. For purposes of the present disclosure, only one of the pulleys, for example 66, need be considered. A drive belt (not shown) is trained about the pulley 66 and driven by mechanism described in my prior application to impart rotation to the shaft 64. It will be obvious that the roller elements 44 and the friction bands 70 thereon will rotate in the same direction as the shaft 64. Since the gears 48, 60 and 62 are only loosely meshed, there is enough backlash between them to permit limited pivotal movement of the arm 50 about the axis of screw 52 and that axis extends generally parallel to the film path adjacent the friction drive roller, as is apparent from FIGS. 1 and 3, and thus permits the drive roller 22 to tilt slightly to ensure firm and even contact of both friction band assemblies with opposite edges of the film 12 even though the axes of the rollers 14 and 22 may not be exactly parallel.

Referring now to FIGS. 5 and 6, an arm 72 is clamped to the lower end portion of the sleeve part 58 of carrier 54 below the platform 4, and serves to effect rotation of the carrier within the journal sleeve 56. The outer end of the arm 72 is provided with a pin 74 passing loosely through opening 76 in a actuator lever 78, which will be further described in greater detail. Between the lever 78 and arm 72 is a compression spring 80 through which a yieldable force can be applied to the arm 72 to rotate the same counterclockwise, as viewed in FIGS. 6, 1 and 3.

Reference will not be made to FIGS. 1, 2 and 3, wherein the actuator lever 78 is shown as being pivotally mounted on the lower side of the platform 4 by suitable pivot means 82. A latch arm 84, rigid with the arm 78, extends to the left from the pivot means 82 and an actuating arm 86, also rigid with the lever 78, extends to the right of the pivot 82 and terminates in a forwardly extending flange 88 (see also FIG. 4) having an adjustable stop screw 90 thereon. The stop screw 90 is in position to be engaged by a starting button 92, only schematically shown in the drawings. Near the flange 88 the arm 86 is also provided with a rearwardly extend ear portion 94.

Near the cartridge station 6 a plunger 96 is slidably mounted, on a bracket 47, fixed to platform 4, to project upwardly through the platform 4 in a position where it can be engaged by the cartridge 8 when the latter is placed in position on the machine. A spring 98 (see FIG. 4) normally urges the plunger 96 upwardly, in the absence of a cartridge, to a position where an enlargement 100 thereon is positioned directly behind the ear 94 of arm 86. This condition is illustrated in FIG. 1 and it will be apparent that the starting button 92 cannot be pushed inwardly from the position shown since the ear 94 will engage the enlargement 100 and prevent such movement. However, when the cartridge 8 is placed in position on the machine, it depresses the plunger 96 to the position shown in FIG. 4, against the action of spring 98, and lowers the enlargement 100 below the level of the ear 94 so that the latter may move thereover and into a reduced diameter portion 102 on the plunger 96. Thus, with the cartridge 8 in position on the machine the starter button 92 may be depressed to the position shown in FIG. 3.

The actuating arm 86 constitutes a rigid part of the actuating lever mechanism for the friction roller 22. A spring 104, however, normally urges the lever 78 to swing in a clockwise direction about its pivot 82 and to the starting position shown in FIG. 1. When this takes place, the lever 78 engages an enlargement 103 on the pin 74 of arm 72 and forcibly swings the arm 72 clockwise, as seen in FIG. 6, and also in FIG. 1, to thereby swing the friction roller 22 out of engagement with film 12 and clear of any cartridge 8 on the machine. This is the normal position of the parts and is the position they assume after threading of the film, as described and until a projection cycle has been completed and the machine has automatically stopped. At this time the cartridge 8 can be lifted from the machine without interference from the roller 22 and upon so lifting the cartridge 8, the plunger 96 moves upwardly and blocks the starting button 92 against actuation.

The film pressure and guide arm 34 previously described is provided with a downwardly extending extension 106 (FIG. 7) projecting downwardly and loosely through a slot 108 in the platform 4. At its lower end the extension 106 is provided with a laterally extending bracket 110 upon which an adjustable detent element 112 is mounted. The detent element 112 is shown in greater detail in FIG. 8 and is shown provided with a slot 113 embracing a pin 114 carried by the bracket 110. The rear end of the detent 112 rotatably embraces an eccentric portion 116 of an adjusting screw 118. Upon rotating the screw 118, the rear end of the detent element 112 is caused to swing laterally to thereby adjust the position of a detent notch 120 in the outer edge thereof relative to the path of movement of the nose abutment 122 at the end of latch arm 84 of actuating lever 78.

Referring again to FIGS. 1 and 3, upon placing a cartridge 8 in position on the machine, it is then possible to depress the starting button 92. That button closes electrical circuits (not shown) and starts various functions of the machine but in addition, it will swing the actuating arm 86, and, therefore, the actuating lever 78, counterclockwise from the position of FIG. 1 to the position of FIG. 3. This results in swing the carrier 54 in a direction to project the periphery of frictional roller 22 through slots 20 into the cartridge 8 and into frictional engagement with the film 12 therein, that engagement taking place at the guide roller 14 and the spring 80 ensuring that the roller 22 bears on the film with sufficient pressure to effect frictional drive thereof without slippage. As the roller 22 rotates, it projects film along the previously described path through the machine.

Referring again to FIG. 1, it is seen that the nose 122 of latch arm 84 is outside the detent notch 120 and bears against one edge of detent 112. However, when the starting button is depressed and the latch arm 84 is swung counterclockwise, the nose 122 forcibly cams the detent 122 and the guide arm 34 by swinging guide arm 34 to the left against the action of its spring 38 and the guide arm 34 will then snap back to the FIG. 3 position when the nose 122 enters the notch 120. With the parts in this position, the actuating lever assembly 78, including arms 84 and 86, is held in the position shown in FIG. 3 even though the starting button 92 may be released. At the commencement of the threading operation, the roller device 42 on the end of guide arm 34 bears directly on the hub 40 of take-up reel 38 and thus holds the detent 112 in position to restrain the arm 84 against clockwise movement. When the leading end of the film 12 reaches the take-up reel, it starts to wind thereon and as the roll of film on that reel increases, the roller device 42 moves radially outwardly of hub 40, since it rides on the outer surface of the film, and thus swings the arm 34 to the left, as seen in FIG. 3. The parts are so dimensioned and adjusted that when a suitable amount of film leader has been reeled onto the take-up reel, sufficient to ensure complete threading of the film in the machine, the arm 34 will have swung far enough to the left so that nose 122 is released from the notch 120 and the spring 104 then operates to swing the actuating lever in a direction to retract friction drive roller 22 from the cartridge and to the idling position shown in FIG. 1.

The parts then remain in this position while successive rows of film are projected, it being understood that this is accomplished without withdrawing all the film from the take-up reel 38 or the cartridge reel at any time. At completion of the projection cycle all of the film is withdrawn from the machine and wound back onto the reel in the cartridge and at which time the guide arm 34 is then returned to the position of FIG. 1 but the friction drive roll 22 remains in the idle position shown until the starting button 92 is again actuated.

As previously mentioned, the apparatus is provided with a stabilizing device 32. The timing sprocket 30 is provided with projections engaging in the perforations along one edge of the film and since it is drivingly connected to the prism 28, the two are forced to rotate in timed relation. Also, since the perforations bear a fixed and definite relationship to the respective picture frames on the film, it is important that the perforations do not slip on the timing sprocket 30 even though the projections thereon are small enough to enter the perforations with considerable clearance. Irrespective of how accurately parts are made, operating clearances are necessary and the longitudinal speed of the film being rolled on take-up 38 cannot be made absolutely constant. There is always some slight change in speed of the reel 38 and vibrations are generated therein which could be transmitted backwardly along the film and cause minute displacement of film relative to the timing sprocket 30, sufficient to cause a noticeable movement of the projected image. The stabilizing device 32, however, applies a constant and uniform side pressure on film adjacent the timing sprocket 30 and is effective to absorb such vibrations and speed deviations.

As shown in FIGS. 3 and 9, the stabilizing device 32 is pivotally mounted on the platform 4 about an upstanding post 150. The device comprises spaced rollers 152 positioned to engage the edge portions of the film 12. The rollers 152 are journalled to rotate about the axis of shaft 154, which in turn is carried by a first U-shaped bracket 156. A second U-shaped bracket 158 pivotally engages the post 150 and the intermediate portions of the brackets 156 and 158 are pivotally joined by a pivot 160 for relative pivotal movement about an axis generally parallel to the film path. A biasing spring 162 urges the bracket 158 to swing about post 150 in a direction and with a force to yieldably press the rollers 152 against the film. The pivot 160 is provided to ensure that both rollers 152 bear against the film with equal and uniform pressure even in the event the upper or lower edge of the film becomes displaced vertically from the opposite edge.

While a single specific embodiment of the invention has been shown and described herein, it is to be understood that the same is merely illustrative of the principles involved and that other embodiments may be resorted to within the scope of the appended claims.

What I claim is:

1. In a self-threading motion picture projector: support means for rotatably supporting a film supply reel; a rotatable take-up reel; guide means for guiding the leading end of a film from said supply reel to said take-up reel along a predetermined path; a movable member having a portion for bearing against film being wound on the take-up reel and for moving radially outwardly as film is wound on said take-up reel; rotary friction drive means adjacent said support means and being mounted for movement between a first position wherein it frictionally engages film in a predetermined portion of said path and a second position laterally spaced from said path; release means for moving said friction drive means from said first to said second position in response to a predetermined outward movement of said movable member; and means for rotating said friction drive means in a direction to move film along said path toward said take-up reel.

2. A projector as defined in claim 1 including manually operable means for selectively moving said friction drive means from said second to said first position.

3. A projector as defined in claim 2 including movable sensing means adjacent said support means to normally block actuation of said manually operable means, said movable sensing means operably positioned between said manually operable means and said friction drive means; means in association with a reel of film; said sensing means movable in response to placing said associated means on said support means to a position wherein it does not block actuation of said manually operable means.

4. A projector as defined in claim 1 wherein said guide means includes a guide roller on that side of said predetermined portion of said path opposite said friction drive means, said friction drive means being arranged, when in said first position, to press the film against said roller.

5. A projector as defined in claim 1 wherein said friction drive means comprises a friction roller journalled on a swingable carrier; manually operable means for swinging said carrier to move said friction roller to said first position; and spring means between said manually operable means and said carrier for resiliently biasing said friction roller toward said path.

6. A projector as defined in claim 5 wherein said friction roller comprises a pair of axially spaced friction bands arranged to engage only opposite edge portions of a film in said path.

7. In a self-threading motion picture projector: support means for rotatably supporting a film supply reel; a rotatable take-up reel; guide means for guiding the leading end of a film from said supply reel to said take-up reel along a predetermined path; a movable member having a portion movable generally radially of said take-up reel and arranged to bear against film being wound thereon whereby to move outwardly as film is wound on said take-up reel; rotary friction drive means adjacent said support means and being mounted for movement between a first position where it frictionally engages film in a predetermined portion of said path in a second position laterally spaced from said path, said drive means comprising a friction roller journalled on a swingable carrier, said friction roller comprising a pair of axially spaced friction bands arranged to engage only opposite edge portions of a film in said path, said friction roller being mounted on said carrier for limited pivotal movement about an axis generally parallel to said path and between said spaced friction bands; release means operable in response to a predetermined outward movement of said movable member for moving said friction drive means from said first to said second position; manually operable means for swinging said carrier to move said friction roller to said first position; spring means between said manually operable means and said carrier for resiliently biasing said friction roller toward said path; and means for rotating said fraction drive means in a direction to move film along said path toward said take-up reel.

8. In a self-threading motion picture projector: support means for rotatably supporting a film supply reel; a rotatable take-up reel; guide means for guiding the leading end of a film from said supply reel to said take-up reel along a predetermined path, a movable member having a portion movable generally radially of said take-up reel and arranged to bear against film being wound thereon whereby to move outwardly as film is wound on said take-up reel; rotary friction drive means adjacent said support means and being mounted for movement between a first position where it frictionally engages film in a predetermined portion of said path in a second position laterally spaced from said path; manually operable means for selectively moving said friction drive means from said second to said first position; release means operable in response to a predetermined outward movement of said movable member, said release means including detent means on said manually operable means; a latch element on said movable member for engaging and holding said detent means whereby to hold said friction drive means in said first position, said latch element being movable with said movable member to release said detent means upon said predetermined outward movement of said movable member; spring means for moving said friction drive means from said first to said second position upon release of said detent means; and means for rotating said friction drive means in a direction to move film along said path toward said take-up reel.

9. A projector as defined in claim 8 wherein said movable member comprises a lever pivotally mounted at one end thereof adjacent a portion of said path, the other end of said lever comprising said portion movable radially of said take-up reel; said latch element being mounted on said lever.

10. In a self-threading motion picture projector: a film supply cartridge removably positioned on said projector and having a side wall, said cartridge having a supply of film therein; at least one opening in said side wall; a guide roller in said cartridge adjacent said opening; an end portion of said film being trained over said roller to bear on a side thereof facing said opening and then extending in a direction outwardly of said cartridge; a friction drive roller movably mounted on said projector for movement between a first position wherein a peripheral portion thereof extends through said opening into frictional bearing engagement with said film bearing on said roller and a second position completely outside said cartridge.

11. A projector as defined in claim 10 including means for rotating said drive roller in a direction to project film from said cartridge; and means responsive to projection of a predetermined length of film from said cartridge for moving said roller from said first to said second position.

12. A projector as defined in claim 10 wherein said film is provided with a row of perforations along at least one edge portion thereof, said drive roller being arranged to bear on said film only along said perforated edge portion.

13. In a self-threading motion picture projector: a film supply cartridge removably positioned on said projector and having a side wall, said cartridge having a supply of film therein; at least one opening in said side wall; a guide roller in said cartridge adjacent said opening; an end portion of said film being trained over said roller to bear on a side thereof facing said opening and then extending in a direction outwardly of said cartridge; a friction drive roller movably mounted on said projector for movement between a first position wherein a peripheral portion thereof extends through said opening into frictional bearing engagement with said film bearing on said roller and a second position completely outside said cartridge; manually operable means for moving said drive roller from said second to said first position; a movable blocking means normally blocking actuation of said manually operable means; and means operable by said cartridge, when in position on said projector, for disabling said blocking means.

14. In a motion picture projector: guide means for guiding film therein along a predetermined path; a rotary prism adjacent said path; a film take-up reel; said guide means including a timing sprocket between said prism and said take-up reel, said timing sprocket and said prism being drivingly connected for rotation in predetermined timed relation; and a stabilizing roller mounted for limited pivotal movement on an axis adjacent said path, substantially parallel to said path, and between said take-up reel and timing sprocket; and resilient means biasing said roller toward said path to yieldably bear against a film therein and prevent transmission of any film vibrations from said take-up reel to said timing sprocket.

15. A projector as defined in claim 1 including movable sensing means adjacent said support means and operably connected to normally block movement of said friction drive means from said second to said first position; and means for moving said sensing means when said supply reel is mounted rotatably on said support means to a position wherein it does not block movement of said friction drive means.

References Cited

UNITED STATES PATENTS

| | | | |
|---|---|---|---|
| 2,089,330 | 8/1937 | Becker | 352—78 X |
| 2,206,476 | 7/1940 | Damblanc | 352—129 |
| 2,466,124 | 4/1949 | Owens | 352—72 X |
| 2,624,232 | 1/1953 | Kingston | 352—72 |
| 2,679,394 | 5/1954 | Lear | 352—72 X |
| 3,243,251 | 3/1966 | Wessner | 352—72 X |
| 3,296,926 | 1/1967 | Kapilow | 352—119 X |
| 3,305,296 | 2/1967 | Nicosia | 352—78 X |
| 3,333,783 | 8/1967 | Guernet | 352—157 X |
| 3,337,146 | 8/1967 | Miyauchi | 352—157 X |
| 3,363,851 | 1/1968 | Rube | 352—157 X |

JOHN M. HORAN, Primary Examiner

M. H. HAYES, Assistant Examiner

U.S. Cl. X.R.

352—119, 158